No. 754,094. PATENTED MAR. 8, 1904.
F. W. ROTH.
LINE EYE ATTACHMENT FOR FISHPOLES.
APPLICATION FILED OCT. 6, 1903.
NO MODEL.
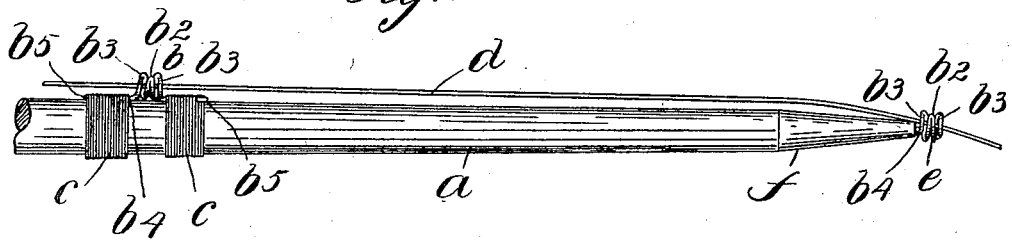
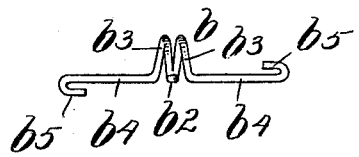
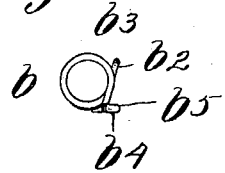
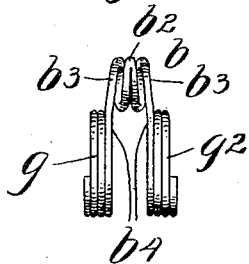
WITNESSES
F. A. Stuart
C. E. Muheany
INVENTOR
Frank W. Roth
BY
Edgar Tate & Co
ATTORNEYS No. 754,094. Patented March 8, 1904.

UNITED STATES PATENT OFFICE.

FRANK W. ROTH, OF WEST HOBOKEN, NEW JERSEY.

LINE-EYE ATTACHMENT FOR FISHPOLES.

SPECIFICATION forming part of Letters Patent No. 754,094, dated March 8, 1904.

Application filed October 6, 1903. Serial No. 175,926. (No model.)

*To all whom it may concern:*

Be it known that I, FRANK W. ROTH, a citizen of the United States, residing at West Hoboken, in the county of Hudson and State of New Jersey, have invented certain new and useful Improvements in Line-Eye Attachments for Fishpoles, of which the following is a specification, such as will enable those skilled in the art to which it appertains to make and use the same.

The object of this invention is to provide improved line-eye attachments for fish rods or poles provided with a reel and through which the line may be passed or with which the line may be connected when provided with a hook and through which the line is free to slide; and with this and other objects in view the invention consists in line-eye attachments for fish rods or poles constructed and applied as hereinafter described and claimed.

The invention is fully disclosed in the following specification, of which the accompanying drawings form a part, in which the separate parts of my improvement are designated by suitable reference characters in each of the views, and in which—

Figure 1 is a side view of a part of an ordinary fish rod or pole provided with my improvement; Fig. 2, a side view of one of the line-eyes detached; Fig. 3, an end view thereof; and Fig. 4, a view similar to Fig. 2, but showing a modification and on an enlarged scale.

In the drawings forming part of this specification I have shown at $a$ a part of a fish rod or pole, the handle portion and reel being omitted, and in the practice of my invention, reference being made to Figs. 1, 2, and 3, I provide a line-eye $b$, which is composed of wire bent centrally to form a loop-shaped hook $b^2$ and then bent to form two side rings or eyes $b^3$, the ends of the wire being then bent to form laterally-directed arms $b^4$, which are preferably provided with hooks $b^5$ or other enlarged end members.

In practice the arms $b^4$ are laid flat on the rod or pole and are secured thereto by wrapping the same with fine thread, as shown at $c$, or the arms $b^4$ may be secured to the rod or pole in any desired manner.

I have shown at $d$ in Fig. 1 a part of a line, and in connecting the line with the eye $b$ the said line is passed laterally into said eye by folding it and passing it beneath the hook $b^2$, and the folded portion of the line is passed over said hook and the line is straightened out and then extends through both of the rings $b^3$, which constitute the line-eye, and when the line is thus connected with said eye it is free to slide therethrough and cannot be accidentally disconnected therefrom, and in order to insure this operation the end portion of the hook $b^2$ projects slightly, as shown in Fig. 3. I have also shown at $e$ in Fig. 1 a line-eye attachment which is secured to the end of the rod or pole by means of a socket $f$, and this line-eye attachment is made exactly in the same manner as that shown in Figs. 1 and 2 with the exception that both of the arms $b^4$ are bent in the same direction and secured in the socket $f$, and the operation of connecting the line $d$ with the line-eye $e$ or passing said line through said eye is the same as that by which said line is connected with the line-eye $b$ or passed therethrough.

In Fig. 4 I have shown a modification of the form of construction shown in Figs. 1 to 3 in which the arms $b^4$ are formed into supplemental rings or eyes $g$, through which the rod or pole $a$ is passed, and these supplemental rings or eyes may be so made as to closely fit the rod or pole at any desired point.

By means of my improvement I provide for the connection of the line with the rod or pole at any desired point and at the same time for the free movement of said line through the said connections, and my invention is not limited to the exact detail herein shown and described, as various changes therein and modifications thereof may be made without departing from the spirit of my invention or sacrificing its advantages.

Having fully described my invention, what I claim as new, and desire to secure by Letters Patent, is—

The combination with a fishing rod or pole of a line-eye attachment into which the line is passed laterally, said line-eye attachment consisting of a central hook portion, a ring or eye at each side thereof, and means whereby the same may be secured to the rod or pole, substantially as shown and described.

In testimony that I claim the foregoing as my invention I have signed my name, in presence of the subscribing witnesses, this 3d day of October, 1903.

FRANK W. ROTH.

Witnesses:
F. A. STEWART,
C. E. MULREANY.